Nov. 14, 1967  R. H. JOHNSON  3,352,564
GASKET CONSTRUCTION
Filed April 9, 1965
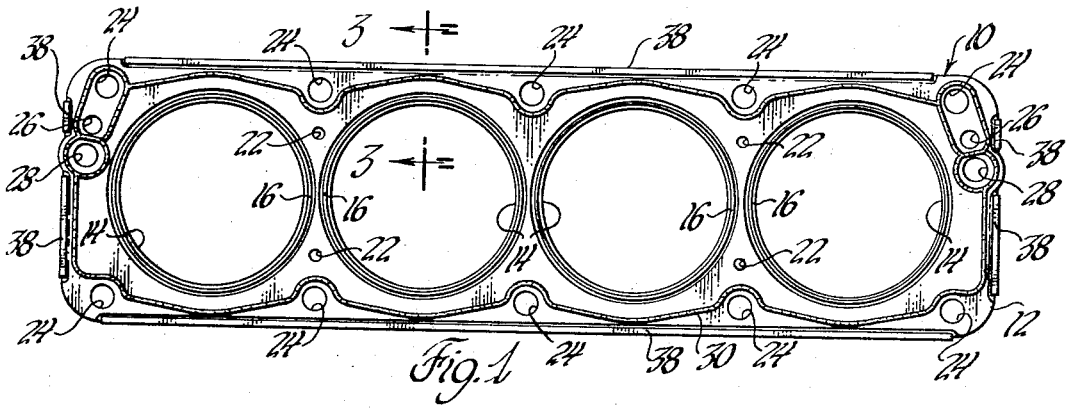
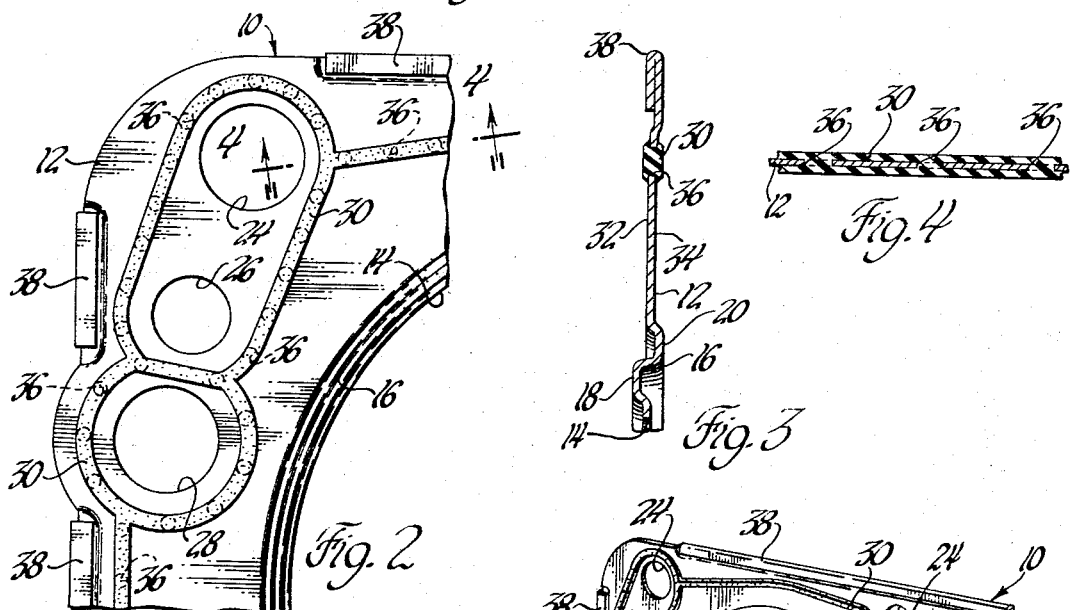
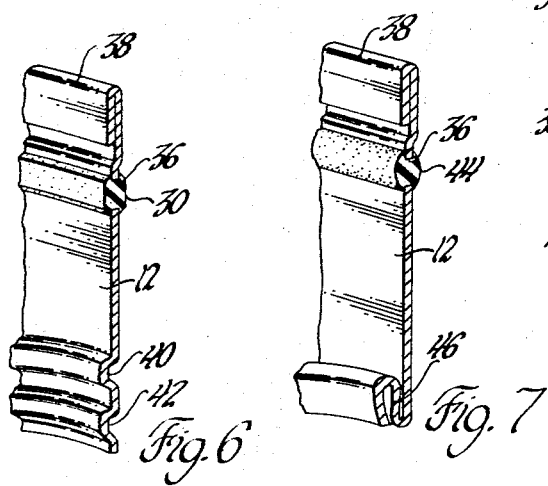
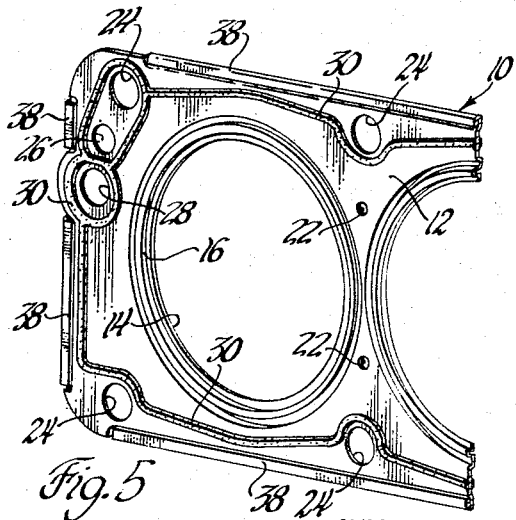
INVENTOR.
Ralph H. Johnson
BY
J. L. Carpenter
ATTORNEY United States Patent Office 3,352,564
Patented Nov. 14, 1967

3,352,564
GASKET CONSTRUCTION
Ralph H. Johnson, Livonia, Mich., assignor to General
Motors Corporation, Detroit, Mich., a corporation of
Delaware
Filed Apr. 9, 1965, Ser. No. 446,989
8 Claims. (Cl. 277—180)

ABSTRACT OF THE DISCLOSURE

An engine cylinder head gasket is formed in part from a single sheet of metal and utilizes, for sealing the water jacket and other fluid openings, an elastomeric bead secured to both sides of the flat metal surface by connection through a series of perforations. The gasket further includes embossments or folded portions to seal the peripheries of the cylinder openings and folded portions along the outer edges to limit the compression of the gasket sealing portions.

This invention relates to a gasket construction, and more particularly to a cylinder head gasket for installation between the cylinder head and block of an internal combustion engine.

The problem of sealing the adjoining surfaces of the cylinder head and block of an internal combustion engine is complicated by the relatively large number of connecting cavities carrying fluids of different types and under different pressures which must be sealed to prevent leakage. These cavities generally include a plurality of cylinders which contain gases varying in pressure from the maximum combustion pressure to the highest vacuums obtained on the suction strokes. Surrounding the cylinders there is generally a water jacket which contains high temperature water or other liquid coolant at a relatively low pressure. The sealing means generally must permit sufficient and properly directed cooling water flow between the water jackets of the engine block and cylinder head. In addition, there are commonly one or more passages extending between the cylinder head and block to provide for the draining of lubricating oil from the cylinder head rocker compartment back to the engine oil pan. Finally, a plurality of bolts or studs are generally provided which comprise the means for securing the head to the block. In addition, one or more dowels may be provided for aligning the cylinder head in relation to the block.

The cylinder head gasket must provide openings registering with the cylinders and various holes for cooling water flow, oil drainage, head bolts and alignment dowels. It must further provide means for sealing the edges of these openings so that there will be no leakage of cylinder pressures, cooling water or lubricating oil beyond the limits of their intended flow passages.

It is apparent that the requirements for sealing the edges of the cylinders will vary somewhat from the requirements for sealing the water jackets and oil drain passages which are at relatively low pressures compared to the cylinders. The cylinder head gasket must be so designed as to positively prevent leakage from the cylinders into the water jackets or vice versa and to prevent contamination of the lube oil by the cooling water or of the cooling water by the lube oil. In addition, leakage of compression, cooling water or lube oil to the exterior of the engine should also be prevented.

The present invention comprises a cylinder head gasket formed from a single piece of sheet metal and carrying in a unique manner an elastomeric bead for sealing the edges of the water jacket and the oil drain passages. The elastomeric bead extends along opposite sides of the gasket and is joined through a line of perforations extending through the metal. The edges of the individual cylinders are sealed from the water jacket by metal beads which are embossed or rolled into the sheet metal of the gasket. The edges of the gasket include folded portions which may be pressed to a predetermined thickness so as to provide controlled compression of the metal and elastomeric beads which are the sealing portions of the gasket.

This type of gasket construction is particularly adaptable to engine block constructions in which the cylinder walls are free standing and separate from the walls of the water jacket. This type of construction has been most commonly proposed for use with engine blocks designed to be formed by die casting. Similarly, the gasket construction is equally appropriate for use with cylinder heads designed with an open area between the combustion chamber walls and the outer walls of the cooling water jacket. An example of such a construction is the cylinder head shown in United States patent application Ser. No. 314,967. If desired, the gasket construction of the present invention may equally well be used with cylinder heads and cylinder blocks of conventional construction wherein the water jacket walls are connected with the cylinder walls or combustion chamber walls by a solid wall member having only the necessary openings for permitting water flow between the cylinder block and cylinder head.

It is believed that the various objects and advantages of this invention will be apparent from the following description of a preferred embodiment which is shown in the accompanying drawings in which:

FIGURE 1 is a top view of a cylinder head gasket according to the present invention;

FIGURE 2 is an enlarged view of a portion of the cylinder head gasket of FIGURE 1 showing the various features in greater detail;

FIGURE 3 is a partial cross-sectional view taken generally along the line 3—3 of FIGURE 1;

FIGURE 4 is a partial cross-sectional view taken generally along the line 4—4 of FIGURE 2;

FIGURE 5 is a partial perspective view of the gasket of FIGURE 1;

FIGURE 6 is a fragmentary perspective view of an alternative embodiment of the gasket of FIGURE 1 showing an alternative configuration for the metal bead embossment for sealing the cylinder walls; and FIGURE 7 is a fragmentary perspective view of still another embodiment showing alternative configurations, for both the elastomeric bead and the cylinder sealing beads.

Referring now to the drawings, numeral 10 generally indicates a cylinder head gasket according to the present invention. The gasket is formed from a sheet metal body 12 which is preferably steel, although any other suitable metal could also be used. If steel is used, it may be desirable to provide a thin coating of noncorrosive material such as tin on the surface to prevent corrosion of the gasket due to contact of the gasket with the engine coolant.

Gasket 10 includes four linearly spaced cylinder openings 14, around the peripheries of which are formed double beaded embossments 16. These embossments are adapted to be compressed between opposing surfaces of the cylinder head and block so as to seal in the cylinder pressures and prevent leakage from the cooling water jacket into the cylinders. As is more clearly seen in FIGURE 3, the embossments are formed by deforming the metal around the cylinder openings both upwardly and downwardly from the plane of the surrounding gasket metal, forming annular rings 18 and 20 respectively.

Between certain of the cylinder openings are located cooling water holes 22 to provide for the passage of coolant between the engine block and the cylinder head. Any number of such holes could be located in the gasket at any desired location between the cylinder sealing means 16 and the water jacket sealing means to be subsequently described. The size, location and number of the cooling water holes is dependent entirely on the characteristics of water flow desired.

Disposed along opposite edges of the gasket in longitudinal rows generally parallel to the row of cylinder openings are a number of cylinder head bolt holes 24 which provide for the securing means extending between the engine block and the cylinder head. At opposite ends of the gasket are a pair of oil drain holes 26 which provide for the passage of oil from openings in the cylinder head to passages in the cylinder block for return to the engine oil sump. Adjacent to the oil drain holes are a pair of dowel holes 28 which allow the provision of locating dowels between the engine block and cylinder head.

The gasket includes novel means for sealing the outer walls of the engine water jacket as well as the oil drain passages which comprise a bead formed of rubber or other elastomeric material. The bead extends along both sides 32 and 34 of the sheet metal gasket material and completely surrounds the row of cylinder openings, lying between them and the rows of cylinder head bolt holes 24, the oil drain holes 26 and the dowel holes 28. The bead divides and passes completely around the dowel holes and it again divides and passes around the oil passage holes 26 and the adjacent cylinder head bolt holes 24. The particular shape of the bead may, of course, be varied as necessary and is arranged so that it meets the opposing sealing surfaces of the cylinder head and engine block which are intended to define the edges of the water jacket at the junction point of the two engine components.

In order to secure the bead onto the opposite faces of the sheet metal gasket, a series of perforations 36 are formed through the gasket metal and spaced linearly along the desired bead location. The elastomeric bead 30 is then molded onto both faces of the gasket at the same time with the perforations being filled by the elastomeric material, thereby connecting the portions of the bead which extend along the opposite sides of the gasket. By this means a unitary elastomeric bead is formed along the opposite sides of the gasket without completely dividing the metal portions of the gasket into separate pieces. The perforations 36 being completely filled with the elastomeric material do not permit the leakage of fluids therethrough. While the drawings illustrate round perforations, it should be noted that any other suitable shape, such as square or rectangular, could be used if desired.

Along the longitudinal and lateral edges of the gasket are formed folded portions 38 which extend continuously along the edges of the gasket except where broken by radii at the corners and where necessary to accommodate a protruding sealing portion, as at dowel holes 28. The folded portions are offset slightly from the adjacent metal of the gasket so that their thickness dimension extends approximately equally above and below the surface of the gasket material. The thickness of the folded portions may be controlled to an accurate dimension by pressing or coining these portions after they are folded over. The folded portions are adapted to separate the cylinder head from the attached cylinder block by a fixed dimension thereby controlling the compression or squeeze which is placed on both the elastomeric bead 30, which seals the water jacket, and the beaded embossments 16, which seal the cylinder openings.

In FIGURE 6 an alternative form of embossment for sealing the cylinder openings is shown. This is also a double embossment but comprises two anular rings 40 and 42 which are both deformed upwardly from the plane of the sheet metal gasket body. In this figure the elastomeric bead 30 is seen to have a generally hexagonal shaped cross section having flat upper and lower portions for seating on the sealing surfaces of the cylinder head and block respectively.

In FIGURE 7 alternative shapes for both the elastomeric bead and the cylinder sealing bead are shown. The elastomeric bead 44 has a generally oval shaped cross section, presenting curved surfaces to the sealing surfaces of the head and block. The sealing means for sealing the cylinder openings is shown as a portion of metal having a loose double fold and arranged for subsequent compression between the cylinder head and block. It should be apparent that other shapes of elastomeric beads and cylinder opening embossments or folded portions could be utilized without departing from the underlying spirit of the present invention.

The present invention may now be seen to comprise a gasket formed from a single sheet 12 of metal, utilizing an elastomeric bead 30 for sealing the exterior of the water jacket and other fluid openings and secured to both sides of the metal surface by connection through a series of perforations 36 through the gasket. The gasket is further provided with embossments 16 or folded portions 46 extending around the peripheries of each of a plurality of cylinder openings 14 for sealing the combustion gases within the cylinders and separating the cylinders from the engine water jacket. The combination of metal embossments and elastomeric beads is ideally adapted to handle the sealing of both high pressure cylinder gases and the low pressure liquids without requiring excessive clamping force on the cylinder head bolts. Along the outer edges of the gasket are formed folded portions 38 which may be pressed to a particular dimension and serve the purpose of controlling the compression both on the elastomeric beads 30 and on the embossments 16 surrounding the cylinder openings. The folded portions 38, at the outer edges of the gasket, also serve to stiffen the complete unit so that it is less likely to be damaged in handling before installation in an engine.

It should be apparent that the advantages of the present invention may be applied to other embodiments of gaskets than those shown in the present application and the invention is, therefore, to be limited only by the language of the following claims.

I claim:

1. A cylinder head gasket for use between the cylinder head and block of an internal combustion engine and comprising
a single piece of sheet metal having a plurality of spaced cylinder openings located centrally of said gasket, a plurality of cylinder head bolt holes located near the edges of said gasket, at least one cooling water hole and at least one oil drain hole, said gasket including
embossed beads surrounding the periphery of each of the cylinder openings and adapted to seal the cylinders from the engine water jacket,
water jacket sealing means extending around all the cylinder openings and cooling water holes and separating them from the bolt holes and the oil holes, said sealing means comprising a line of spaced perforations and a unitary bead of elastomeric material formed in a continuous strip along both sides of flat portions of said sheet metal body and joined through said perforations and
folded portions along the outer edges of said gasket and adapted to limit the compression of said cylinder opening embossed beads and said water jacket sealing means.

2. The device of claim 1 wherein said folded portions extend along the major portion of the edges of said gasket thereby stiffening said gasket to prevent damage in handling.

3. A cylinder head gasket as defined in claim 1 wherein said cylinder head opening embossed beads and said water jacket sealing means each have predetermined thicknesses in the uncompressed state, said folded portions being relatively incompressible and having a predetermined thickness less than the thicknesses of said cylinder head opening embossed beads and said water jacket sealing means in the uncompressed state.

4. A cylinder head gasket for use between the cylinder head and block of an internal combustion engine having a plurality of cylinders and a cooling water jacket surrounding the cylinders, said gasket comprising a sheet metal body having a plurality of spaced cylinder openings adapted to register with the engine cylinders and at least one cooling water hole adapted to register with the water jacket, compressible cylinder sealing means comprising annular beads embossed in the sheet metal body of the gasket and surrounding the periphery of each cylinder opening, said cylinder sealing means being adapted to be compressed between the cylinder head and the block to prevent leakage between the cylinders and the water jacket, and compressible water jacket sealing means surrounding all the cylinder openings and cooling water holes and adapted to be compressed between the cylinder head and the block to seal the edges of the water jacket, said water jacket sealing means comprising a line of spaced perforations in flat portions of said metal body and a unitary bead of elastomeric material formed in a continuous strip along both sides of said sheet metal body flat portions and joined through said perforations.

5. A cylinder head gasket for use between the cylinder head and block of an internal combustion engine having a plurality of cylinders and a cooling water jacket surrounding the cylinders, said gasket comprising a sheet metal body having a plurality of spaced cylinder openings adapted to register with the engine cylinders and at least one cooling water hole adapted to register with the water jacket, compressible cylinder sealing means surrounding the periphery of each cylinder opening and adapted to be compressed between the cylinder head and the block to prevent leakage between the cylinders and the water jacket, compressible water jacket sealing means surrounding all the cylinder openings and cooling water holes and adapted to be compressed between the cylinder head and the block to seal the edges of the water jacket, said water jacket sealing means comprising a line of spaced perforations in flat portions of said metal body and a unitary bead of elastomeric material formed in a continuous strip along both sides of said sheet metal body flat portions and joined through said perforations, said compressible cylinder sealing means and said compressible water jacket sealing means each having a predetermined thickness in the uncompressed state and folded metal portions along the outer edges of said gasket, said portions being relatively incompressible and having a predetermined thickness less than the thicknesses of all said sealing means to limit the compression of said sealing means to predetermined amounts.

6. The cylinder head gasket of claim 5 wherein said compressible cylinder sealing means comprises annular beads embossed in the sheet metal body of the gasket.

7. A gasket formed in part from a deformable metal sheet of substantially uniform thickness and having openings for the passage of fluid therethrough, sealing means at least partially surrounding said openings and comprising a series of spaced perforations extending through said sheet and arranged in generally linear fashion, a compressible elastomeric bead having portions disposed on opposite sides of said sheet and joined through said perforations, said bead being adapted to form a fluid tight seal with the opposite sides of said sheet when said gasket is compressed between a pair of assembled parts and deformed portions of said sheet arranged to locally increase the effective thickness of said sheet to a dimension less than the thickness of said bead, said deformed portions being engageable by said assembled parts to limit the compression of said elastomeric bead to a predetermined amount.

8. A gasket as defined in claim 7 wherein said deformed portions comprise folded portions of said sheet disposed along the outer edges of said gasket.

References Cited
UNITED STATES PATENTS

| | | | |
|---|---|---|---|
| 1,863,893 | 6/1932 | Bailey | 277—236 |
| 2,679,241 | 5/1954 | Dickson | 277—180 X |
| 2,722,043 | 11/1955 | Nenzell | 277—180 X |
| 3,053,544 | 9/1962 | Gorsica | 277—180 |

SAMUEL ROTHBERG, *Primary Examiner.*